Patented Feb. 20, 1934

1,948,407

UNITED STATES PATENT OFFICE 1,948,407

IMPROVED PROCESS FOR THE RECOVERY OF VALUABLE CONSTITUENTS FROM HYDROGENATION CATALYSTS

Rhea N. Watts, Baton Rouge, La., assignor to Standard-I. G. Company

No Drawing. Application September 19, 1930
Serial No. 483,140

3 Claims. (Cl. 23—238)

The present invention relates to the manufacture of catalytic materials and the recovery of valuable constituents from such materials and more specifically to an improved process for the recovery and manufacture of catalytic substances used in the hydrogenation of carbonaceous materials.

In the hydrogenation of carbonaceous materials such as petroleum oils, coal, lignite, tars, asphaltic materials and the like, it has been proposed to use various catalytic materials among which molybdenum and tungsten compounds have been mentioned. These materials are used in single or admixture or combination or in admixture with other materials, such as oxides or carbonates of the alkaline earth and rare earth metals, as well as alumina and various inert substances such as clay or asbestos which may serve as supports for the active ingredients. While these catalysts have long life and are not deteriorated by the action of sulfurous and other impurities contained in crude oils, they finally become inactive for reasons little understood at the present time. It is then necessary to recover the catalytic materials and particularly those more expensive substances such as molybdenum and tungsten.

The present process comprises an improved method for separately recovering tungsten and molybdenum from spent or partially spent catalysts. It is highly desirable to recover these materials separately in a state of relatively high purity so that they may be incorporated in the proper proportions to give the desired result since the activity of the catalyst for the particular purpose may vary widely depending on its composition. The catalysts used in the hydrogenation process may be in the form of small lumps or fine powders comprising tungstic and molybdic acids and/or the sulphides of these elements as the principal constituents. Other materials which may or may not have catalytic properties may be present, for example, magnesia, alumina, zinc oxide and other earths are valuable additions and clay, silicates, active carbon and the like may be used as supports or carriers. The first step in the process is the conversion of the sulfides to oxides which is accomplished by thoroughly roasting the dry mass in an oxidizing atmosphere at an elevated temperature which should be below such temperature as would cause the molybdenum to volatilize, from about 800° F. to 900° F. The roasted product is then treated with an aqueous solution of an acid, preferably hydrochloric acid, whereby molybdic acid is caused to dissolve leaving tungstic acid undissolved. Six normal hydrochloric acid is satisfactory for the purpose. Separation is now made by filtration and molybdic acid may be precipitated by the addition of ammonia but it is preferable to first treat the filtrate with an oxidizing agent, such as nitric acid, to prevent reduction by any hydrogen sulfide which may be present. Care should be taken in the precipitation of the molybdic acid with ammonia, preferably 28% aqua ammonia, so as to leave the solution slightly on the acid side, that is to say leaving 1 to 3% of the acid unneutralized. While it is preferable to use ammonia any other suitable base such as caustic soda, caustic potash or their carbonates may be used. If magnesia is present in relatively large amounts it is also precipitated by the ammonia and it is desirable to redissolve the molybdic acid, say in 12% ammonia in which the magnesium salt is practically insoluble. The solution is filtered and $MoO_3$ again precipitated by adding 1 to 3% excess of acid.

The separate precipitates of tungstic and molybdic acids are then carefully washed and dried. If substances insoluble in hydrochloric acid, such as alumina, are present in the original catalytic material it will be understood that such substances will now be in admixture with the tungstic acid and they may be removed by dissolving the tungstic acid in strong ammonia or other suitable base, preferably with the acid of heat. After filtration, the tungstic acid may be reprecipitated by the addition of acid. In many instances the tungstic acid is sufficiently pure without solution and reprecipitation.

It will thus be understood that the two most costly constituents, molybdic and tungstic acids, are obtained separately in a state of substantial purity and they may be reincorporated in any desired proportion with each other and with the other materials noted above, for the preparation of a new catalytic mass. The method of recovery in no way decreases the activity of these materials and my recovery method may be readily and easily accomplished.

My invention is not to be limited by any theory of the mechanism or chemical reactions by which the active constituents of the catalysts are separated, nor to any illustrative example given above. I wish my claims to be limited only by the following claims, in which I wish to claim all novelty inherent in the process.

I claim:

1. The method for the preparation of an active hydrogenation catalyst from spent hydrogenation catalyts containing molybdenum, which comprises roasting the spent catalyst, digesting the roasted mass with an acid solution capable of dissolving molybdic oxide, separating the solution thereof from the residue, adding to the solution an amount of alkali insufficient for neutralization whereby the molybdic oxide is precipitated, then reincorporating the recovered molybdic oxide with suitable constituents of the class of alkaline earth and rare earth oxides, carbonates, alumina, clay and asbestos.

2. Method according to claim 1 in which the roasted mass is digested with hydrochloric acid containing a few per cent of nitric acid, and the solution is partially neutralized with ammonia.

3. The method for the preparation of an active hydrogenation catalyst containing molybdenum and tungsten from spent hydrogenation catalysts containing the same, which comprises roasting the spent catalyst, digesting the roasted mass with hydrochloric acid whereby molybdenum is dissolved, separating the solution containing molybdenum from the residue containing tungsten and partially neutralizing the solution by the addition of ammonia whereby molybdic oxide is precipitated, recovering the molybdic and tungstic oxides and reincorporating each with other suitable constituents selected from the class of alkaline earth and rare earth oxides and carbonates, alumina, clay and asbestos.

RHEA N. WATTS.